Patented July 1, 1952

2,602,043

UNITED STATES PATENT OFFICE 2,602,043

METHOD FOR PRODUCING TYROTHRICIN

Winifred R. Mitchell, Lynbrook, N. Y., assignor to Commercial Solvents Corporation, Terre Haute, Ind., a corporation of Maryland No Drawing. Application September 26, 1945, Serial No. 618,794

4 Claims. (Cl. 195—4)

This invention relates to a method for producing tyrothricin by the propagation of the organism Bacillus brevis on nutrient media, and more particularly to a process utilizing as an essential component of the nutrient medium the waste corn steeping water resulting from the manufacture of corn starch.

It has been known that the organism Bacillus brevis when propagated on certain nutrient media is capable of producing a material having antibiotic activity against certain pathogenic organisms. This antibiotic material has been named tyrothricin, and recently has been found to contain at least two individual antibiotics, gramicidin and tyrocidin.

The media used in the past for propagating the organism Bacillus brevis have included some of the expensive laboratory media such as tryptone, peptone and yeast extract. Such media supported growth and tyrothricin production only when cultured in shallow, stationary layers, and not in aerated submerged cultures of such media. A less expensive medium has recently been developed for surface culture of Bacillus brevis utilizing cannery wastes such as asparagus butt juice.

Recently it has been found that Bacillus brevis could be grown in submerged aerated cultures and would produce tyrothricin, in a so-called synthetic medium containing glucose, nutrient salts and the amino acid asparagine or d-glutamic acid.

Such media, however, produced low yields of tyrothricin, of the order of between 100 to 200 mg. of tyrothricin per liter of culture liquor. Moreover, such media were altogether unsatisfactory for the commercial preparation of the antibiotic because of the expense and lack of availability of the ingredients, particularly of the amino acids used as the nitrogen source.

I have now found that relatively much higher yields of tyrothricin may be produced using a medium for the propagation of the organism Bacillus brevis, comprising as an essential ingredient so-called "corn steeping waters" which are the accumulated waste waters resulting from the manufacture of corn starch.

In the manufacture of corn starch the corn is soaked or "steeped" in so-called "process water," i. e., water which has been previously used in milling and the like, for the purpose of softening the corn for milling. This steeping is carried out in a series of operations in which the incoming fresh corn is treated with the most concentrated waters which have already been used to steep the corn in the latter stages. The last stage of steeping before milling, is done with fresh process water, usually containing some sulfur dioxide, and after the treatment, the water from the final stage is used in next to the last stage, and so on, until after steeping the fresh corn, some of the resulting "steep water," usually containing about 6% soluble solids, is reused in other operations, but a great part remains as waste, and is either discarded or dried and incorporated in cattle feed or the like.

In carrying out my invention, I utilize this so-called corn steep water, either alone, or admixed with added nutrients such as sugar, nutrient salts and the like, as the nutrient medium for the propagation and culture of the organism Bacillus brevis. The steep water may be used as it is obtained from the starch manufacturing process or it may first be dried, to preserve it and the solids reconstituted in water as desired to the original or other desired concentration.

The medium is prepared by placing it in a fermentation vessel equipped as desired for surface growth or for submerged aerated fermentation. The steep water is usually adjusted to a known solids content, and the other nutrients added if desired. While the steep water alone will support growth of Bacillus brevis, considerably higher yields are obtained if a sugar such as glucose is added together with small quantities of nutrient salts such as potassium dihydrogen phosphate. Calcium carbonate may be used as a buffer. Commercial grades of glucose are satisfactory such as the product known by the trade name of "Cerelose."

The medium is adjusted to a neutral or slightly alkaline pH, sterilized and inoculated with an active culture of Bacillus brevis at a temperature favorable for its growth and tyrothricin production, preferably between about 30° to 40° C.

The fermentation according to my invention may be carried out as surface fermentation or as a submerged process, that is, one wherein the organism grows throughout the mass of the liquid medium in depth. I prefer to carry out my process as a submerged operation because of its commercial advantages, and in order to support the growth of Bacillus brevis, which is an areobic organism, the medium is supplied with oxygen in the form of sterile air or other oxygen-containing gas, in such a way that sufficient oxygen for efficient growth and tyrothricin production is made available to the organism during the course of the fermentation.

This "aeration" may be accomplished in any desired manner as by shaking or rotating the fermentation vessel in the presence of air or by forcing streams of air through the medium under a positive pressure. In commercial equipment aeration may advantageously be accomplished by the use of porous tubes in the fermentation vessel, through which air is forced in fine bubbles and is evenly dispersed through the medium. The dispersion of the air may be aided by gentle agitation if desired.

The culture for inoculating the medium may be prepared in any desired known manner such as by allowing the spores of a stock culture to propagate on any suitable nutrient medium at favorable growth temperatures for a period sufficient to initiate growth and produce an active culture. A series of transfers at suitable intervals may be resorted to if desired. If the organism is carried on a nutrient agar slant it is usually sufficient to develop it by transferring a small amount of this growth to a few hundred ml. of liquid nutrient medium and to incubate this medium for a period of about 18 to 24 hours. A portion of this active culture is then used to inoculate the main fermentation medium, using a greater or lesser quantity depending on the quantity of medium to be fermented. Usually quantities in the neighborhood of 0.5 ml. of active culture per liter of culture medium will be sufficient to assure good growth and tyrothricin production in the medium.

The following specific example will further illustrate my invention.

EXAMPLE

A series of culture media were prepared in liter flasks using the proportions of nutrients indicated in the table below, the remainder being water. Corn steep water was used, adjusted to the percentage solids indicated. As the sugar, the commercial glucose called "Cerelose" was used. In each liter flask was placed 100 ml. of nutrient medium of the composition indicated. The pH was adjusted to 6, and the media were sterilized by heating in an autoclave at 120° C. for thirty minutes. The various media were then aseptically adjusted to pH 7.5 and were each inoculated with 0.5 ml. of a 24 hour surface culture of Bacillus brevis grown on a nutrient medium.

The media were then incubated at 37° C. for a period of six days. Cultures of each medium were continuously aerated by shaking the partially filled flasks on a mechanical shaker during incubation which completely submerged the growing culture and kept it in a state of aeration. Duplicates in each case were allowed to grow in a quiescent state to compare yields by surface and submerged culture methods. The table below lists the results obtained.

TABLE

*Tyrothricin production using corn steep water as culture medium for Bacillus brevis at 37° C.*

| Medium | Yields in Grams per Liter | | | | | |
|---|---|---|---|---|---|---|
| | 4 Days | | 6 Days | | 12 Days | |
| | Submerged | Surface | Sub | Surface | Sub | Surface |
| 4% Steep (by wt)+1% cerelose+salts [1] | .4 | | .42 | 1.0 | | |
| 4% Steep (by wt)+2% cerelose+salts | .46 | | .46 | 1.6 | | |
| 4% Steep (by wt)+3% cerelose+salts | .77 | | 1.17 | 1.4 | 1.6 | |
| 3% Steep+1% cerelose+salts | .36 | | .18 | 1.0 | | |
| 5% Steep+1% cerelose+salts | .45 | | .41 | .86 | | |
| 6% Steep+1% cerelose+salts | .45 | | .26 | .77 | | |
| 8% Steep+1% cerelose+salts | .31 | | .19 | .73 | | |
| 8% Steep+no cerelose no salts | .27 | | .2 | .58 | | |
| 4% Steep+3% cerelose+no salts+0.5% tryptone | .99 | | 1.1 | 2.3 | 1.0 | 2.6 |
| 4% Steep+2% cerelose+0.5% tryptone | .9 | | 1.1 | 1.5 | .9 | 1.9 |
| 4% Steep+1% cerelose+0.5% tryptone | .9 | | .9 | 1.3 | .78 | |
| 2% Steep+3% cerelose+salts+0.5% tryptone | .9 | | 1.0 | 2.96 | 1.02 | 3.1 |
| 3% Steep+3% cerelose+salts+0.5% tryptone | 1.0 | | 1.11 | 2.77 | 1.3 | 3.2 |
| 4% Steep+3% cerelose+salts+0.5% typrtone | 1.4 | | 1.6 | 1.75 | 1.27 | 3.4 |
| 2% Steep+2% cerelose+salts+1.0% tryptone | 1.0 | | .77 | 1.96 | 1.09 | 2.4 |

[1] Salts = KH$_2$PO$_4$ 0.05%
    CaCO$_3$ 0.05%

While the above describes the preferred embodiments of my invention, it will be understood that departures may be made therefrom within the scope of the specification and claims.

What is claimed is:

1. In a process for preparing tyrothricin, the steps which comprise, inoculating with an active culture of *Bacillus brevis* a nutrient liquid medium comprising as essential nutrient components, glucose and corn steep water, maintaining said medium at a temperature between 30° C. and 40° C. while agitating and supplying oxygen to the medium, until tyrothricin has been produced.

2. In a process for preparing tyrothricin by propagation of the organism *Bacillus brevis* on nutrient media, the step which comprises carrying out the fermentation in a culture medium comprising corn steep water while maintaining the growing organism in a submerged state and supplying oxygen thereto during the course of the fermentation.

3. In a process for preparing tyrothricin by propagation of the organism *Bacillus brevis* on nutrient media, the step which comprises carrying out the fermentation in a culture medium comprising corn steep water and glucose while maintaining the growing organism in a submerged state, and supplying oxygen thereto during the course of the fermentation.

4. In the production of tyrothricin, the process which comprises subjecting to submerged fermentation with the organism *Bacillus brevis* a nutrient culture salts, while maintaining the nutrient culture medium comprising corn steep water, glucose and nutrient salts, while maintaining the temperature of the medium within the range of about 30° to 40° C. and while supplying oxygen to the medium.

WINIFRED R. MITCHELL.

(References on following page)

REFERENCES CITED

The following references are of record in the file of this patent:

UNITED STATES PATENTS

| Number | Name | Date |
|---|---|---|
| 1,582,408 | Legg | Apr. 27, 1926 |
| 1,932,755 | Stiles | Oct. 31, 1933 |
| 2,020,251 | Stiles | Nov. 5, 1935 |
| 2,314,831 | Kamlet | Mar. 23, 1943 |
| 2,406,174 | Stokes | Aug. 22, 1946 |

OTHER REFERENCES

Moyer et al., sec. 1 (c) Monthly Progress Report No. 16, Coghill, Nov. 20, 1943, page 2.

Schatz et al., Proc. Soc. Exptl. Biol. and Med., 55, Jan. 1944, pages 66 to 69.

Cardinal and Hedrick, Jour. Biochemical Soc., 172, 1948, pp. 609–612.

Dimick et al., Industrial and Engineering Chemistry, 37, 10, Oct. 1945, pp. 996 to 1004.

Stokes et al., "Formation of Tyrothricin by Submerged Cultures of Bacillus Brevis," Jr. Bact. 46, 1, July 1943, pp. 83–88.

---

Certificate of Correction

Patent No. 2,602,043      July 1, 1952

WINIFRED R. MITCHELL

It is hereby certified that error appears in the printed specification of the above numbered patent requiring correction as follows:

Columns 3 and 4, table at top of page, first column, second line from the bottom thereof, for "typrtone" read *tryptone*; column 4, line 67, strike out "nutrient culture salts, while maintaining the";

and that the said Letters Patent should be read as corrected above, so that the same may conform to the record of the case in the Patent Office.

Signed and sealed this 9th day of December, A. D. 1952.

[SEAL]

THOMAS F. MURPHY,
*Assistant Commissioner of Patents.*

REFERENCES CITED

The following references are of record in the file of this patent:

UNITED STATES PATENTS

| Number | Name | Date |
|---|---|---|
| 1,582,408 | Legg | Apr. 27, 1926 |
| 1,932,755 | Stiles | Oct. 31, 1933 |
| 2,020,251 | Stiles | Nov. 5, 1935 |
| 2,314,831 | Kamlet | Mar. 23, 1943 |
| 2,406,174 | Stokes | Aug. 22, 1946 |

OTHER REFERENCES

Moyer et al., sec. 1 (c) Monthly Progress Report No. 16, Coghill, Nov. 20, 1943, page 2.

Schatz et al., Proc. Soc. Exptl. Biol. and Med., 55, Jan. 1944, pages 66 to 69.

Cardinal and Hedrick, Jour. Biochemical Soc., 172, 1948, pp. 609–612.

Dimick et al., Industrial and Engineering Chemistry, 37, 10, Oct. 1945, pp. 996 to 1004.

Stokes et al., "Formation of Tyrothricin by Submerged Cultures of Bacillus Brevis," Jr. Bact. 46, 1, July 1943, pp. 83–88.

---

Certificate of Correction

Patent No. 2,602,043      July 1, 1952

WINIFRED R. MITCHELL

It is hereby certified that error appears in the printed specification of the above numbered patent requiring correction as follows:

Columns 3 and 4, table at top of page, first column, second line from the bottom thereof, for "typrtone" read *tryptone*; column 4, line 67, strike out "nutrient culture salts, while maintaining the";

and that the said Letters Patent should be read as corrected above, so that the same may conform to the record of the case in the Patent Office.

Signed and sealed this 9th day of December, A. D. 1952.

[SEAL]

THOMAS F. MURPHY,
*Assistant Commissioner of Patents.*

Certificate of Correction

Patent No. 2,602,043                                                  July 1, 1952

WINIFRED R. MITCHELL

It is hereby certified that error appears in the printed specification of the above numbered patent requiring correction as follows:

Columns 3 and 4, table at top of page, first column, second line from the bottom thereof, for "typrtone" read *tryptone*; column 4, line 67, strike out "nutrient culture salts, while maintaining the";

and that the said Letters Patent should be read as corrected above, so that the same may conform to the record of the case in the Patent Office.

Signed and sealed this 9th day of December, A. D. 1952.

[SEAL]

THOMAS F. MURPHY,
*Assistant Commissioner of Patents.*